Feb. 18, 1936.  K. BAUMANN ET AL  2,031,521
HYDRAULIC COUPLING
Filed June 14, 1933  3 Sheets-Sheet 2

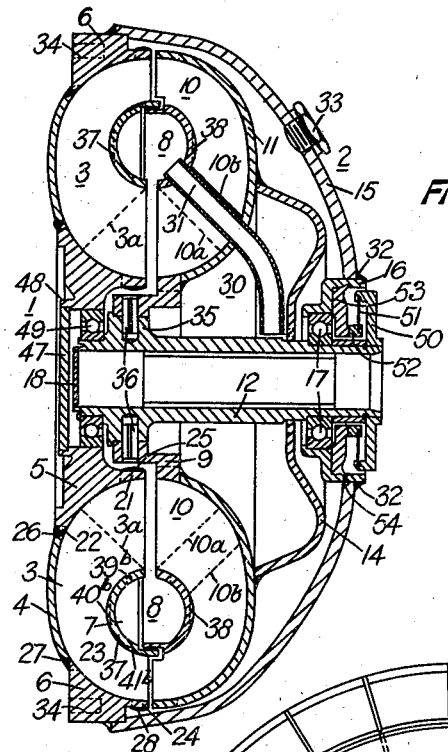

INVENTORS
Karl Baumann
Harold Sinclair
BY
ATTORNEY

Feb. 18, 1936.  K. BAUMANN ET AL  2,031,521
HYDRAULIC COUPLING
Filed June 14, 1933   3 Sheets-Sheet 3

INVENTORS
Karl Baumann
Harold Sinclair
By
ATTORNEY

Patented Feb. 18, 1936

2,031,521

UNITED STATES PATENT OFFICE 2,031,521

HYDRAULIC COUPLING

Karl Baumann, Urmston, and Harold Sinclair, Surbiton Hill, England

Application June 14, 1933, Serial No. 675,862
In Great Britain June 28, 1932

9 Claims. (Cl. 60—54)

This invention relates to hydraulic couplings of the Föttinger type in which the two halves of the coupling, one forming the driving and the other the driven member, are provided with substantially radial vanes, each enclosed in an annular shell or cover plate. The rotation of the driving member causes a movement of the liquid from the inner ends of the vanes to the outer ends thereof, the liquid passing thence into the driven member or runner and circulating from the outer ends of the vanes to the inner ends and so back to the impeller. Couplings of this type are well known, and the object of the present invention is to provide an improved construction of driving and driven elements which shall be cheap and strong and at the same time be as efficient as the couplings heretofore constructed.

According to the invention, the various parts of the improved coupling, including the driving and driven members, hereinafter referred to as impellers and runners, are constructed of separate portions united together, for example, by welding.

In carrying out the invention the impellers may be formed with a number of vanes or plates disposed radially within a housing comprising a shell or cover plate, an inner ring and an outer ring. The vanes may be approximately semi-elliptical in form with a semi-circular portion removed from the diameter intermediate the ends thereof, or somewhat nearer that end of the diameter which is at the outer end of a vane. When assembled to form an impeller the inner curved portions of the vanes are connected by a central ring or shrouding, the space between which and a corresponding shrouding uniting the inner edges of the vanes of the co-operating runner forms an annular chamber of circular cross-section which may be used as a scoop chamber in some special constructions and is referred to as such in this specification.

The runner may be formed somewhat similarly to the impeller, namely with vanes of somewhat similar shape, a shell or cover plate, and an inner ring, hereinafter termed the carrier ring, by which the runner is connected to a shaft to be driven through the coupling. Usually the dimensions of the parts are such that the runner shell or housing projects over and encloses the end of the driven shaft and an annular plate mounted at its center on the driven shaft is secured to the shell at a suitable part thereof in order to support the overhanging portion of the same. In a preferred construction the runner is also enclosed by an outer housing carried on the outer ring of the impeller and attached to a ring or bushing which projects within the central orifice of the annular supporting ring for the impeller which it carries through a suitable bearing. Said projecting inner ring of the housing is supported by a bearing on the driven shaft of the coupling. The spaces between the runner shell and the annular plate and driven shaft may be used as a reservoir or chamber. This chamber may be absent in some constructions, in which case, the construction of the runner becomes similar to the construction of the impeller.

According to a further feature of the invention, in a construction as above described, the vanes are secured to the center ring or shrouding by means of one or more projections on the vanes engaging in slots in the ring, but without these parts being welded together. The projections and slots are arranged, by virtue of their shape and disposition, to lock the shrouding ring against movement relative to the vanes in the radial direction, and in some cases also to render the shrouding ring self-locking in the axial direction, although in other cases the axial movement is prevented by means of a lock-nut or lock-ring which is caused to engage with the vanes and the shrouding ring.

The invention is illustrated by way of example in the accompanying drawings in which Figure 1 is a vertical cross-sectional view of a preferred form of coupling according to the invention.

Fig. 1a is a detail section illustrating the connection of the shrouding and vanes of the impeller on an enlarged scale.

Fig. 2 is a view in elevation of the inner side of the runner.

Similar parts throughout the drawings are denoted by the same numerals.

Figure 3:
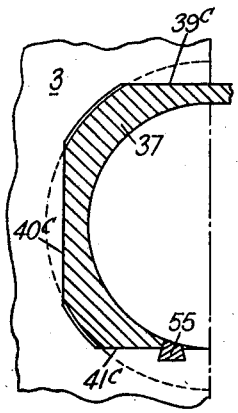
Figs. 3, 4 and 5 are detail sections which illustrate alternative means of securing the vanes of both the impeller and the runner to shrouding rings without welding them together.

Referring to Fig. 1 of the drawings, the coupling consists essentially of an impeller 1 and a runner 2. The impeller 1 is formed with twenty-six vanes or plates 3 disposed radially within a housing which comprises a shell or cover plate 4 of steel pressed to the required shape, an inner steel ring 5 and an outer steel ring 6. The vanes 3 are approximately semi-elliptical in form and have semi-circular portions 7 removed from their central regions, somewhat nearer the outer ends than the inner ends, the vanes because of this specific form having opposite concave edge portions and convex edge portions.

The runner 2 is formed somewhat similarly to the impeller 1 with twenty-four vanes 10 corresponding in shape to the vanes 3, disposed radially within a shell or cover plate 11, and an inner carrier ring 9, by which latter the runner is connected to a hollow shaft 12 which is to be driven through the coupling. The runner shell 11 which is constructed of steel plate pressed to the required shape, projects over the end of the driven shaft 12, and an annular plate 14, mounted at its centre on the driven shaft 12, is secured to the shell 11 at a suitable intermediate part thereof, in order to support the overhanging portion and to form a reservoir or chamber. The runner 2 is enclosed by an outer housing 15 carried on the outer ring 6 of the impeller 1 and attached at its center to a ring or bushing 16 which projects inwardly and is supported on the shaft 12 by a suitable bearing 17.

The inner curved portion of the vanes 3 of the impeller 1 are connected to a center ring or shrouding 37, and a corresponding shrouding 38 unites the inner edges of the vanes 10 of the runner 2. The space formed between these rings provides an annular chamber 8 of circular cross-section which is used as a scoop chamber. The space 30 between the outside of the runner shell 11, the inside of the annular plate 14, and the outside of the driven shaft 12 constitutes a reservoir or chamber. Six tubes are provided on the runner, communicating between the scoop chamber 8 and the reservoir or chamber 30, two long ones 31, extending inwardly close to the shaft 12 and four short ones 31a, terminating at their inner ends at the outer portion of the chamber 30. In order to allow the fluid to pass through the coupling into the reservoir or chamber, it is necessary to displace the air from the reservoir or chamber. The longer tubes permit air to pass from the reservoir or chamber back into the coupling itself.

Figure 6:
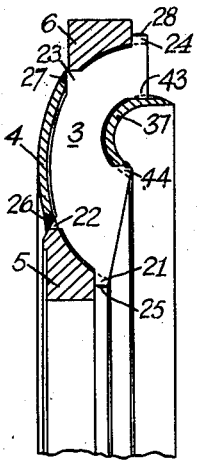
Figs. 6, 7, 8 and 14 are detail sections which show alternative forms of impeller vanes and details of their construction.

As will be seen more clearly from Fig. 6, in one construction, the vanes 3 are each provided on their peripheries or convex edges with four tongues or projections 21, 22, 23, 24, which are disposed in corresponding slots in the circumferential margins of the inner ring 5 and the outer ring 6, and are welded to these parts externally as shown at 25, 26, 27, 28. The inner ring 5 and the outer ring 6 form the margins or continuations of the shell or cover plate 4 and are united respectively to the inner and outer edges of the shell by the same welds 27, 28, that secure the projections 23 and 22, respectively, from the vanes 3 to the shell at this point.

Figure 7:
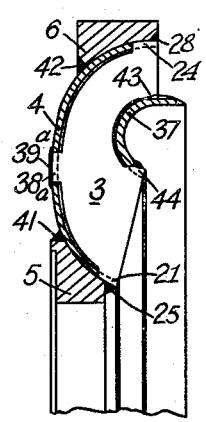
Figure 16:
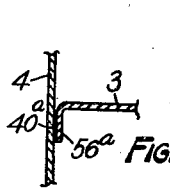

In an alternative construction, illustrated in Fig. 7, the shell or cover plate 4 for the impeller vanes 3, extends within and overlaps the inner ring 5 and also within and overlaps the outer ring 6, and is welded thereto at 41, and 42 respectively. Each vane is provided with a projection 38a, (as detailed in Fig. 17) extending from its outer circumference intermediate the ends, which projection is disposed in an appropriate slot in the shell or cover plate 4 and welded thereto on the outside, as shown at 39a. In place of a projection 38a, the vane 3 may be butt-welded at this point to the inside concave portion of the shell as denoted at 40a in the construction illustrated in Fig. 8 and Fig. 18. This weld is very conveniently effected by the method known as resistance welding. The vane 3 may, if desired, be provided on its peripheral edge with a projecting tongue 56a, as shown in Figs. 16 and 18 which tongue may be welded to the plate 4 to secure the vane thereto.

In the arrangement shown in Figs. 1 and 1a, the inner circumferential portions or concave edges of the vanes 3 are provided with three projecting parts 39b, 40b, 41b, which enter corresponding slots in the shrouding ring 37. These projections may if desired be welded to the shrouding ring.

Figure 8:
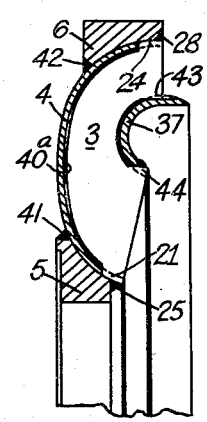
Figure 14:
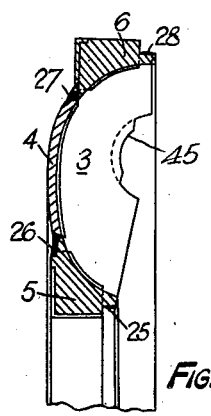

Instead of providing the three projections 39b, 40b and 41b on each vane, as shown in Figs. 1 and 1a, two projections 43 and 44 as shown in Figs. 6, 7 and 8, or a single projection 45 intermediate the ends of the inner semi-circular portion of the vane as shown in Fig. 14, can be arranged to project each into an appropriate slot in the shrouding ring 37 where it is secured by welding or other means.

Figure 9:
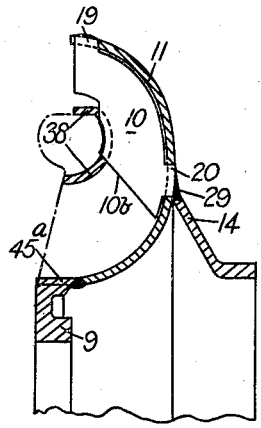
Figs. 9, 10, 11, 12 and 13 are detail sections which show alternative forms of runner vanes and details of their construction and securing means.
Figure 10:
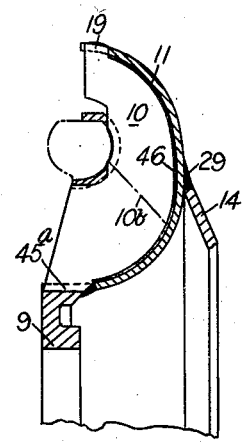
Figure 11:
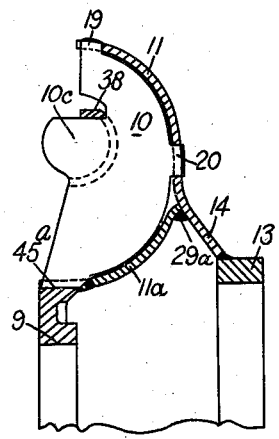
Figure 12:
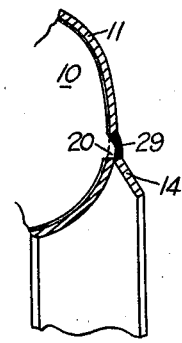
Figure 13:
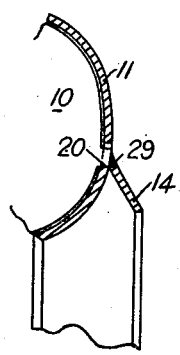

Figs. 9, 10 and 11 illustrate somewhat similar methods and constructions which may be applied in the case of the runner 2. In these constructions, projections 19 from the outer circumferential portions of the vanes 10 are disposed in appropriate slots in the shell or cover plate 11 of the runner, and projections 45a from the inner circumferential portions of the vanes are received in slots in the carrier ring 9. The runner has no outer ring corresponding to the ring 6 of the impeller but its shell 11 is attached intermediate its circumferential edges to the annular plate 14. In the constructions shown in Figs. 9, 12 and 13 a projection 20 from the vane 10 passes through a slot of the shell 11 so that the vane 10, the shell 11 and the annular plate 14, may all be secured together at this point by a single weld 29. In the arrangement shown in Fig. 11, the inner circumferential edge of the annular plate 14 is welded to a housing ring 13, by which it is supported from a bearing on the driven shaft 12, or when employed in the construction shown in Fig. 1, from a bearing on the inwardly projecting ring or bushing 16. The annular plate 14 is formed in one piece with the outer circumferential portion of the shell 11 and the inner circumferential portion 11a of the shell is formed of a separate piece united by welding at 29a to the annular plate 14.

Fig. 10 shows another construction of runner 2, in which instead of the vanes 10 being provided with intermediate projections 20 disposed in slots in the shell 11, they are butt-welded to the concave inner surface of the shell as shown at 46.

In alternative constructions which may be applied to the vanes of both the impeller and the runner, the vanes 3 and 10 may be secured to the shrouding rings 37 or 38 by means of one or more projections on the vanes which engage in slots in the ring without the parts being welded together. In these constructions, the projections and slots are arranged, by virtue of their shape and disposition, to lock the shrouding ring against movement relative to the vanes in the radial direction. In some cases the shrouding ring may be rendered self-locking in the axial direction, and in other cases, the axial movement may be prevented by means of a lock-nut or lock-ring which is caused to engage with the vanes and the shrouding ring.

In one such construction shown in Fig. 1 and more clearly in Fig. 1a, the vanes 3 or 10 are each provided on their inner circumferential portions with three projecting parts 39b, 40b, and 41b. Two of the projections 40b and 41b engage in corresponding slots in the shrouding ring, while the third 39b, which is disposed adjacent the widest end of the vane, is accommodated in a slot which is cut completely through the shrouding ring adjacent the inner circumferential edge thereof. This slot and its co-operating projection 39b are formed with abutting edges which are at right angles to the axis of the impeller or runner and thus serve to lock the shrouding ring against subsequent movement relative to the vanes in the axial direction. During assembly, the projection 39b at the wider end of a vane is inserted in its slot and the vane is then levered about this end until the other projections are aligned with their corresponding slots, whereupon pressure is applied to the peripheral edge of the vane if necessary in order to drive the projections of the vanes into their slots and to cause the abutment of the projections 39b at the wider end of the vanes with the shoulders formed by the ends of the slots in the ring.

Figure 4:
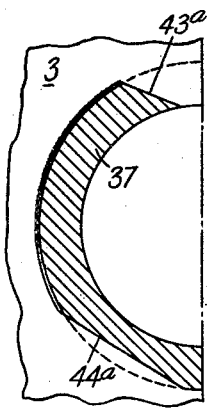

In another construction which is illustrated in Fig. 4 as applied to the securing of a vane 3 of an impeller 1 to a shrouding ring 37, the vanes 3 are each provided on their inner circumferential portions with two projections 43a and 44a, of which projection 44a is disposed at the wider end of a vane and projection 43a intermediate the ends of the vane, and preferably nearer the narrow end. The projections are accommodated in corresponding slots in the shrouding ring 37, the slot for the projection 43a being cut completely through the shrouding ring at the inner circumferential edge thereof, as in the construction just previously described. In this case, however, this slot and its cooperating projection 43a are formed with abutting edges which are inclined to the axis of the vane. By forming the projection 44a and its slot with their abutting edges parallel to the abutting edges for the end slot and its projection 43a, the vanes 3 can readily be assembled on the shrouding ring without any levering action. In this construction, the shrouding ring 37 is automatically locked against radial movement and also against axial movement when the outer circumferential portions of the vanes 3 are secured to the housing.

In another alternative construction as illustrated in Fig. 3, the vanes 3 are each provided on their inner circumferential portions with three projections 39c, 40c and 41c, the projection 41c being disposed at the wider end of the vane. The projections are adapted to be accommodated in corresponding slots in the shrouding ring 37, the projection 41c being accommodated in a slot which is cut completely through the shrouding ring adjacent the inner circumferential edge thereof. The projection 41c and its slots are so formed that their abutting edges are parallel to the axis, so that movement of the shrouding ring relatively to the vanes in the radial direction is prevented and movement in the axial direction is restricted. The shrouding ring 37 is completely locked against axial movement by a locking ring 55 which is accommodated in an annular groove formed adjacent the inner peripheral edge of the shrouding ring 37 so that when in position, it engages the vanes 3 and the shrouding ring 37 firmly. The vanes 3 may be assembled on the shrouding ring 37 and the lock ring 55 fixed in position before the assembly is inserted in the housing 4, 5, 6 and the outer circumferential portions of the vanes 3 secured thereto. Alternatively the vanes 3 may be assembled on the shrouding ring 37 and secured at their outer circumferential portions to the housing 4, 5, 6 before the lock ring 55 is put into position.

Figure 5:
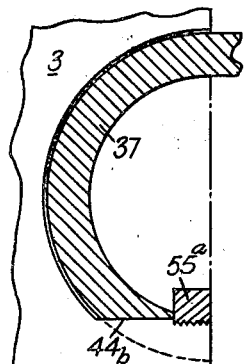

In a further alternative construction as illustrated in Fig. 5, the vanes 3 are provided each with a single projection 44b which is disposed at the wider end of the vane and is accommodated in a slot which is cut completely through the shrouding ring 37 adjacent the inner circumferential edge thereof. The projection 44b and the slot are formed with abutting edges which are parallel to the axis and relative movement between the shrouding ring 37 and the vanes 3 is prevented by means of a nut 55a which is screwed on to the shrouding ring adjacent its inner peripheral edge and firmly engages both the vanes and the shrouding ring. The lock nut may be positioned before or after the vanes are secured to the housing.

Figure 15:
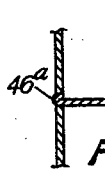
Figs. 15, 16, 17 and 18 are detail sections which illustrate alternative means of securing vanes in their housings.
Figure 17:
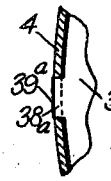
Figure 18:
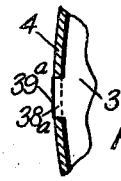

The vanes 10 of the runner 2 may be made in several different shapes. In the construction shown in Figs. 1 and 2, of the twenty-six vanes on the impeller 1, thirteen are full length vanes and the remainder are shorter, being cut back to an angle of 45° at one end as shown by the dotted lines 3a. In the runner 2, half of the twenty-four vanes 10 are full length as shown in the full lines in Fig. 1, while six of these remaining vanes are cut back to 45° at one end as denoted by the dotted lines 10a, and the remaining six are cut back as shown at 10b, (Figs. 1, 2, 9 and 10) to clear the tubes 31 and 31a. In an alternative construction of vane as shown in Fig. 11, a portion 10c is provided which projects through the shrouding ring 38 into the scoop chamber 8.

Where portions of the vanes of the impeller or runner are disposed or interfitted in slots in the shells or rings, the width of the slots may be made approximately double the thickness of the vane, the projection of the vane being made longer and folded over at this point as shown at 46a in the sectional views Figs. 15 and 17 so as to approximately fit the slot.

The outer housing 15 which surrounds the runner 2, is formed by a saucer shaped or dished plate, the outer circumferential edge portion of which projects over and is welded to the outer ring 6 of the impeller 1. The housing is provided with a central opening in which the inner projecting housing 16 is disposed and which surrounds the driven shaft 12, to which part it is united by welding as denoted at 32. The housing 15 is provided with one or more plugs 33 disposed at a suitable level, by which liquid may be introduced into the coupling and the quantity thereof varied. To facilitate the forming operation the shells or housings and annular plate may consist of two concentric circular portions of pressed steel which are united together by welding.

The welding of all the vanes to the various parts may very conveniently be effected after assembly in a jig or temporary holder by means of an automatic circular welding machine, though spot welding or other forms of welding, for example, that known as atomic hydrogen welding. The latter is well known as being suitable where special precautions against leakage are desirable.

Slots in the various parts which are to receive the projections from the vanes may be readily made as they occur at the edges of the various rings.

The impeller 1 may be attached to a flange on the driving shaft by bolts screwed into suitably tapped holes 34 in the outer ring 6, whilst the runner 2 is secured to the driven shaft 12 by means of bolts or dowels 36 which engage a flange 35 on the shaft.

The inner end of the hollow shaft 12 is sealed by means of a disc 18, having a chamfered edge, which is retained in position by a flange formed at the end of the shaft being deformed after the disc 18 is correctly positioned. The ring 5 is also provided with a similar closing disc 47 held in position by a deformed flange 48 on the ring member 5. The inner end of the shaft 12 is supported within the ring 5 by a suitable bearing 49.

The outer end of the shaft 12 is provided with an annular plate member 50 having a flange carrying a flexible diaphragm member 51. This diaphragm carries at its inner edge, a sealing ring 52 which bears against a co-operating sealing disc 53 secured within the housing 16. The disc is secured in position in the housing in a fluid-tight manner by deformation of its marginal portion into a corresponding V groove 54 cut in the inner surface of the housing 16.

It will be evident that various constructional modifications of the arrangement, hereinbefore described by way of example, may be made within the scope of the parent invention.

We claim:

1. For a hydraulic coupling, a rotary member comprising a plurality of approximately semi-elliptical, approximately radially spaced vanes, a housing therefor comprising a ring member provided on one circumferential edge with a series of slots, a projection on the outer convex edge of each vane disposed in a slot in the ring member, an annular cover plate applied to the outer convex edges of the vanes so that one of its circular edges is located in proximity to the slots in the ring member and the projections of the vanes in said slots, the ring member, the vanes and the cover plate being united by a single circular zone of welding.

2. For a hydraulic coupling, a rotary member comprising a plurality of approximately semi-elliptical, approximately radially spaced vanes, a housing therefor comprising an inner ring member, an outer ring member and an intermediate dished annular cover plate, one ring member having a circular series of slots, a projection on the outer convex edge of each vane disposed and welded in said slots so that the three parts, namely the ring member, the cover plate and the vane, are united by a single weld at the said point.

3. For a hydraulic coupling, a rotary member comprising a plurality of approximately semi-elliptical vanes, the convex edge portions having projections, a housing in which said vanes are welded in spaced approximately radial relationship, said housing comprising an inner ring member having slots engaging some of the projections on the convex edge portions of the vanes, an outer ring member provided with slots engaging other projections of the convex edges of the vanes, an annular cover plate disposed intermediately of said rings welded at its outer edge to the outer ring member and at its inner edge to the inner ring member, and said inner and outer ring members and said cover plate being welded to the vanes at the zones of engagement of the projections of the latter with the slots in the former.

4. For a hydraulic coupling, a rotary member comprising a plurality of approximately semi-elliptical and approximately radially spaced vanes, a housing therefor comprising an inner ring member, an outer ring member and an annular cover plate intermediate said ring members, each of said ring members and said cover plate being welded to each vane at two points on the outer curved edge of the vane.

5. For a hydraulic coupling, a rotary member comprising a plurality of approximately semi-elliptical vanes having convex and concave edge portions, projections on said edge portions, a housing in which said vanes are welded in spaced relationship, said housing comprising a ring member provided with slots engaging some of the projections on the convex edge portions of the vanes, and a dished annular cover plate provided with slots engaging the other projections on the convex edge portions of the vanes, said cover plate being welded at its edge to the ring member, and said ring member and cover plate being welded to the vanes at the zones of engagement of the projections of the latter with the slots in the former, and a shrouding ring disposed within the said concave edge portions having slots engaging the projections on the concave edge portions of the vanes.

6. For a hydraulic coupling, a rotary member comprising a plurality of approximately semi-elliptical, radially spaced vanes, a housing therefor comprising an inner ring member, an outer ring member and an intermediate cover plate, said members and cover plate of the housing and said vanes being secured together, a shrouding ring connecting the concave edge portions of the vanes and provided with slots, and projections on the concave edge portions of said vanes engaged in said slots to lock the shrouding ring against movement relative to the vanes in radial and axial directions, each vane being engaged in at least two of said slots.

7. For a hydraulic coupling, a rotary member comprising a plurality of approximately semi-elliptical, radially spaced vanes, a housing therefor comprising an inner ring member, an outer ring member and an intermediate cover plate, said members and cover plate of the housing and said vanes being secured together, a shrouding ring connecting the concave edge portions of the vanes and provided with slots, projections on the concave edge portions of said vanes engaged in said slots to lock the shrouding ring against movement relative to the vanes in radial and axial directions, each vane being engaged in at least two of said slots, one of said projections having a radial edge which engages a corresponding radial face in a slot to lock the shrouding ring against movement relative to the vanes in an axial direction, another projection engaging in a slot to lock the shroud against movement in a radial direction.

8. A hydraulic coupling including an impeller comprising an inner ring member, a plurality of approximately semi-elliptical vanes disposed radially in spaced relationship, an outer ring member, an annular cover plate disposed between said ring members, said ring members and cover plate being secured to the convex edges of said vanes, a shrouding ring to which the concaved edges of said vanes are connected, a runner coaxial with the impeller, a dished annular plate enclosing said runner and secured at its periphery to the said outer ring member, said runner comprising an inner ring member and an annular cover plate, a plurality of approximately semi-elliptical vanes secured radially in spaced relationship at their convex edges to the second mentioned inner ring member and annular cover plate, a shrouding ring to which the concave edges of the last mentioned vanes are secured, a shaft connected to the second mentioned inner ring member, an annular supporting plate mounted at its center on said shaft and secured at its periphery to said runner cover plate to provide a reservoir for liquid, said shrouding rings coacting to provide a scoop chamber between them, and a plurality of tubular members communicating at one end with said reservoir and at the other end with said scoop chamber.

9. A hydraulic coupling including an impeller comprising a plurality of approximately semi-elliptical vanes and provided on their convex and concave edges with projections, a housing in which said vanes are welded in spaced radial relationship, said housing comprising an inner ring member provided with slots engaging certain of the projections on the convex edges of the vanes, an outer ring member provided with slots engaging other projections of the said convex edges of the vanes, an intermediately disposed, dished, annular cover plate welded marginally to the outer ring member and at its inner edge to the inner ring member, said inner and outer ring members and said cover plate being welded to the vanes at the zones of engagement of the projections of the latter with the slots in the former, and a shrouding ring secured to the concave edge portions of the vanes having slots engaging the projections on the latter edges of the vanes, said projections being welded to the shrouding ring; a runner comprising a plurality of approximately semi-elliptical vanes provided on their convex and concave edges with projections, a housing in which said second mentioned vanes are welded in spaced radial relationship comprising an inner ring member provided with slots engaging certain of the projections on the convex edges of the second mentioned vanes, a dished annular cover plate provided with slots engaging the other projections on the convex edges of the second mentioned vanes, said second mentioned cover plate being welded at its inner edge to the second mentioned inner ring member, said latter ring member and second mentioned cover plate being welded to the runner vanes at the zones of engagement of the projections of the latter with the slots in the former, a shrouding ring disposed within the concave edge portions of the second mentioned vanes and having slots engaging the projections on the concave edges of the latter vanes, a shaft for the runner, an annular supporting plate marginally welded to the outer side of the runner cover plate and supported at its center on the said shaft and forming a reservoir in combination with the runner cover plate, and tubular members in communication with the space between the shrouding ring of the runner and the shrouding ring of the impeller, certain of the tubular members communicating with the inner portion of the reservoir and others of said tubular members with the outer portion thereof; and a housing for the runner comprising a dished annular plate marginally welded to the outer ring member of the impeller, and a bushing journalled on said shaft and secured in a fluid-tight manner to the inner edge portion of said last mentioned plate.

KARL BAUMANN.
HAROLD SINCLAIR.